United States Patent [19]
Pilkington

[11] Patent Number: 4,920,495
[45] Date of Patent: Apr. 24, 1990

[54] SHEET CUTTING MACHINE

[75] Inventor: Donald J. Pilkington, Kettering, United Kingdom
[73] Assignee: GFM Holdings AG, Austria

[21] Appl. No.: 219,670
[22] Filed: Jul. 15, 1988
[51] Int. Cl.[5] ........................ G06F 15/00; G05B 19/00
[52] U.S. Cl. ........................ 364/474.37; 364/474.09; 364/474.03; 83/56; 83/76.7; 83/368; 83/862; 83/880; 83/881; 83/940
[58] Field of Search .................... 83/71, 925 CC, 879, 83/880, 881, 56, 368, 940, 862; 33/546, 551, 553, 554, 504; 364/474.03, 474.09, 474.37

[56] References Cited

U.S. PATENT DOCUMENTS 3,719,113 3/1973 Gerber et al. .......................... 83/56
4,524,894 6/1985 Leblond ................................ 83/879
4,637,248 1/1987 Thompson et al. ............ 364/474.37
4,702,652 10/1987 Rokksku et al. ............... 364/474.37
4,811,253 3/1989 Johns ............................. 364/474.37

FOREIGN PATENT DOCUMENTS 3315520 11/1983 Fed. Rep. of Germany .
3539430 5/1987 Fed. Rep. of Germany .

*Primary Examiner*—Frank T. Yost
*Assistant Examiner*—Hwei-Siu Payer
*Attorney, Agent, or Firm*—Frishauf, Holtz, Goodman & Woodward

[57] ABSTRACT

In a sheet cutting machine in which a guidance system moves a blade across a work surface, the blade height is adjusted in accordance with stored data of irregularities of the guidance system and work surface relative to each other. The machine is also operable in a mapping mode in which the blade is replaced by a sensor which is scanned over the work surface, and the sensor output data is stored in the memory.

29 Claims, 4 Drawing Sheets

FIG. 2
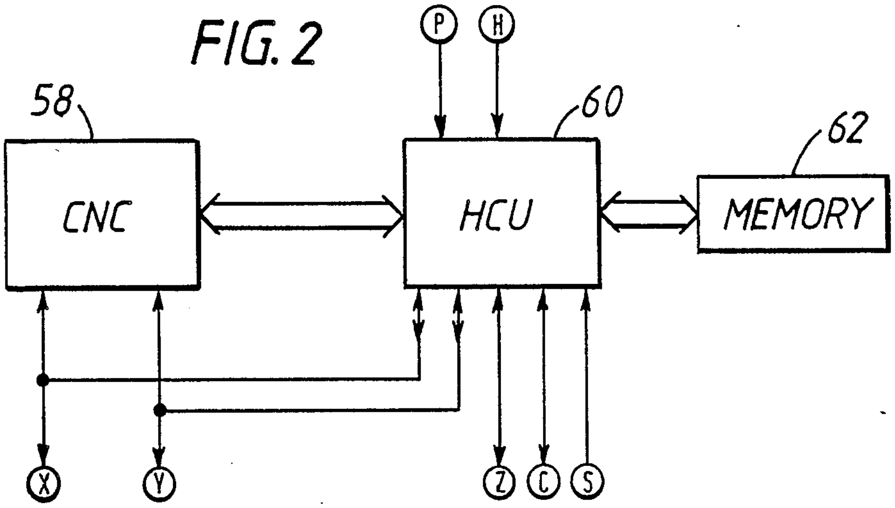
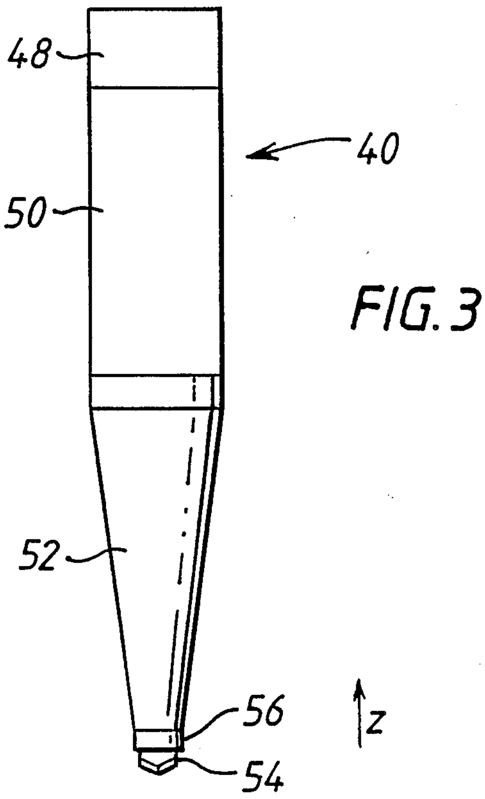
FIG. 3

SHEET CUTTING MACHINE

FIELD OF THE INVENTION

This invention relates to a cutting machine for cutting sheet-like workpieces.

More particularly, the invention is concerned with such a cutting machine of the type comprising a work surface on which to lay a sheet-like workpiece, a blade, and a guidance system to guide the blade along a cutting path to cut the workpiece along that path.

BACKGROUND TO THE INVENTION

In order to achieve precision cutting either to a precise depth into the workpiece, or completely through the workpiece and possibly to a precise depth into the work surface, it is desirable, in the case of flat sheet cutting, to produce a perfectly planar work surface and to guide the blade for movement at a constant height relative to the work surface. Such perfection cannot, of course, be achieved, and the closer to perfection a machine is made, the more expensive it is and the more care must be taken with it.

The invention is more particularly concerned with a machine of the type defined above which also includes means to adjust the height of the blade as the blade moves along the cutting path.

In one known machine of this type, an ultrasonic sensor mounted with the blade senses the height of the sensor above the upper surface of the workpiece and the height of the blade (and sensor) is adjusted on the basis of the output from the sensor. A disadvantage of this arrangement is that, if there are any small air pockets between the workpiece and the work surface, or if there are any small rucks in the workpiece, then these will be sensed and the height will be adjusted, but the workpiece will then be pressed flat against the work surface by the blade and an error will occur.

In another known machine of this type, an eddy current sensor mounted with the blade senses the height of the sensor above the work surface and the height is adjusted on the basis of the sensor output. However, a disadvantage of this arrangement is that the sensor output varies with variations in the bulk of the work surface support structure in the vicinity of the sensor, such as strengthening members of the support structure, and furthermore the sensor output is affected if the workpiece is of a conductive material such as metal or carbon fibre.

The present invention seeks to provide an apparatus of the type defined above in which the blade can cut to a precise height without requiring the work surface and blade movement to be perfectly planar and without suffering the disadvantages of the height adjustment systems described above.

SUMMARY OF THE INVENTION

A first aspect of the present invention is characterised in that the height adjusting means comprises a memory which stores data indicative of irregularities of the guidance system and the work surface relative to each other, the height adjusting means being response to the stored data in adjusting the height of the blade. Thus, if the blade is used to kiss the work surface and cut right through the workpiece, this can be done without damaging the blade against the work surface, and if the blade is spaced from the work surface to cut partly through the workpiece, the thickness of uncut material can be closely controlled. In both cases, the height adjustment is not influenced by small rucks in or air pockets beneath the workpiece, nor by the structure of the work surface support structure.

Preferably the machine is provided with a height sensor which can be used to replace the blade, and the machine can be operated in a mode in which the sensor is scanned across the work surface by the guidance system, and data produced by the sensor is stored in the memory. The machine needs to be operated in this mode when it is initially commissioned, and the operation may, if desired, be repeated at prolonged intervals so that the height adjustment means can take account of distortions or variations which may have arisen, for example due to bedding in of the support structure for the work surface or wear in the guidance system.

Preferably, the height sensor includes a stylus which engages the work surface to sense the height. Preferably also, for each position of the guidance system the height sensor senses the height at the same position as that taken up by the blade when the sensor is replaced by the blade. This provides a further advantage over the known ultrasonic and eddy current sensors described above, which by necessity must sense height at a position offset from the blade position.

In a development of the machine according to the invention, the work surface is provided by any of plurality of interchangeable pallets which are supported by a support structure of the machine, the memory includes a height data for each of the pallets, and the machine further includes means for indicating which pallet is loaded onto the machine. Thus, the processing efficiency of the machine can be increased by laying out workpieces on one pallet, while the other pallet is loaded onto the machine for cutting, and the apparatus can take account of variations in evenness between the different pallets.

A second aspect of the present invention is concerned with a method of operation of a cutting machine of the type defined above in which the blade cuts through a workpiece and into the work surface. The second aspect of the invention is characterised by the step of cutting into the work surface to a nominal depth which is not greater than twice the tolerance range of height adjusting means, preferably not greater than the tolerance range, and more preferably about equal to half the tolerance range.

In a typical example of the height adjusting means according to the first aspect of the invention, the height of the blade relative to the work surface can be controlled to a tolerance of $\pm 0.05$ mm, that is a tolerance range of 0.1 mm, and thus the blade is used to cut into the work surface to a depth not greater than $0.2 \pm 0.05$ mm preferably not greater than $0.1 \pm 0.05$ mm, and more preferably about $0.05 \pm 0.05$ mm. Thus, the amount of damage to the work surface is small, and yet a clean cut of the workpiece can be achieved.

A third aspect of the present invention is concerned with a method of operation of a cutting machine of the type defined above, in which the blade cuts a score line in the workpiece to leave a portion of the thickness of the workpiece uncut. The third aspect of the invention is characterised by the step of cutting into the workpiece to a nominal height above the work surface which is not greater than twice the tolerance range of the height adjusting means, preferably not greater than the tolerance range, and more preferably slightly greater than half of the tolerance range. Thus, the nominal uncut thickness of the workpiece, in the example given above, is not greater than 0.2±0.05 mm, preferably not greater than 0.1±0.05 mm and more preferably slightly greater than 0.05±0.05 mm. Thus a relatively deep score line can be cut without cutting completely through the workpiece.

A fourth aspect of the invention is concerned with a method of operation of a cutting machine of the type defined above in which the workpiece is placed on a backing sheet and the blade cuts through the workpiece and into the backing sheet. The fourth aspect of the invention is characterised in that the blade cuts to a nominal depth into the backing sheet which is not greater than twice the tolerance range of the height adjusting means, preferably not greater than said tolerance range, and more preferably is about equal to half of said tolerance range. Thus, the blade cuts completely through the workpiece and yet does not cut to any great depth into the backing sheet, and so the cut workpiece(s) can be removed from the machine in place on the intact backing sheet.

Preferably, the blade of the cutting machine is vibrated ultrasonically in a direction at right angles to the work surface, and in this case the peak-to-peak amplitude of vibration of the blade tip is preferably less than tolerance range of the height adjusting means.

BRIEF DESCRIPTION OF THE DRAWINGS

There follows a description by way of example of a specific embodiment of the present invention with reference to the drawings, in which:

FIG. 2 is a block diagram showing the control system for the apparatus;

FIG. 3 is a side view of an ultrasonic cutting head used in the machine;

DESCRIPTION OF THE PREFERRED EMBODIMENT

Figure 1:
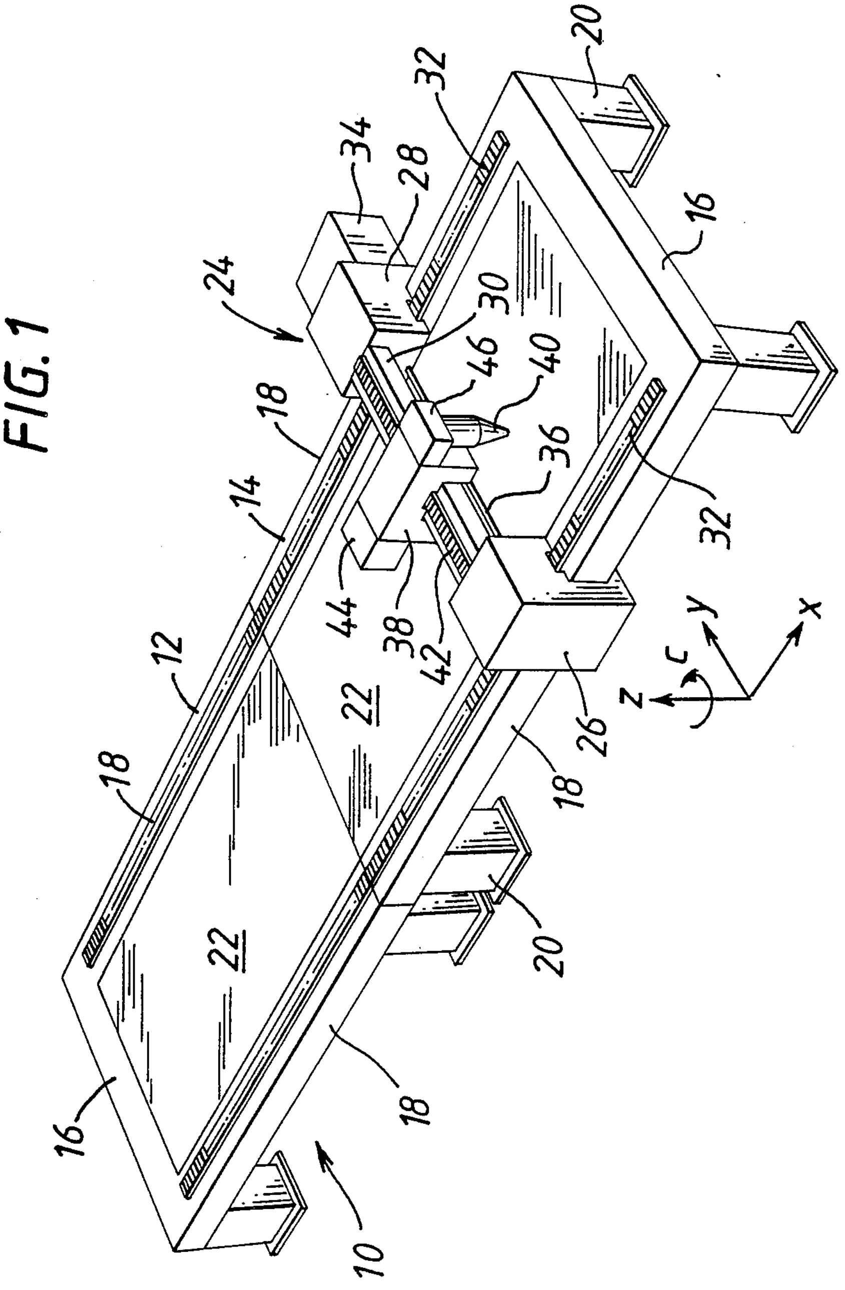
FIG. 1 is a schematic perspective view of a cutting machine according to the invention.

Referring to FIG. 1, the cutting machine comprises a rigid modular support structure 10 having, as shown, two modules 12, 14 arranged in line. Each module may be of the order of 2 to 4 m long and 2 m wide. Further modules may be added to increase the length of the structure. Each module 12, 14 comprises a pair of end members, one of which is shown at 16, for each module, and two side members 18 arranged in a rectangle and supported at its corners on four legs 20. The inside edges of the members 16, 18 are rebated, to support pallets 22, which provide the work surface of the cutting machine. Locking devices are provided for holding the pallets 22 in place relative to the support structure.

The side members 18 form slideways for a gantry 24. The gantry has a pair of side portions 26, 28, which are mounted for sliding along the side members 18, and a cross piece 30 rigidly connecting the side portions 26, 28. Each side member 18 of the support structure is formed with a rack 32 along its length, and the side portions 26, 28 of the gantry are provided with pinions which engage the racks 32 and are driven by a DC stepper motor 34 mounted on the side portion 28 of the gantry and a drive shaft 36 extending between the two side portions of the gantry. By this means the gantry can be controllably moved along the support structure 10 in the X direction. The cross piece 30 acts as a slideway for a saddle 38 on which an ultrasonic cutting tool 40 is mounted. The cross piece 30 is formed with a rack 42, which engages with a pinion mounted in the saddle 38 and driven by a further DC stepper motor 44. The cutting tool 40 can therefore be moved controllably across the support structure 10 under the control of the motor 44 in the Y direction. The cutting tool 40 is mounted on the saddle 38 by a drive mechanism which can adjust tfhe height of the cutting tool 40 in the Z direction and which can rotate the cutting tool 40 in the C direction around the Z axis. Accordingly, the cutting tool 40 can be moved to any desired position across the pallets 20 under control of the two motors 34, 44 and can be adjusted in height and direction by the drive mechanism 46.

The specific method of mounting the cutting tool described thus far is conventional, and alternative equivalent arrangements may be used. For example, rather than using racks 32, 42 for movement in the X and Y directions, recirculating ball screw arrangements may be used.

Referring particularly to FIG. 3, the cutting tool 40 comprises a converter 48 which converts a 20 kHz electrical signal into a physical oscillation at the same frequency. The oscillation is amplified by a half wavelength booster 50 and half wavelength exponential horn 52. A cutting blade 54 having a blade holder 56 is attached by a screw thread to the lower end of the horn 52. The blade vibrates in the Z direction at the ultrasonic frequency. The cutting tool described thus far is also conventional. Typically, when used in the present invention, the amplitude of oscillation of the blade is 0.05 mm peak-to-peak, or less.

Referring particularly to FIG. 2, the control system for the cutting machine comprises a computer numerically controlled unit (CNC) 58, a head control unit (HCU) 60 and a memory 62.

The CNC 58 supplies X and Y signals to the x and y motors 34, 44 to control movement of the cutting head along a desired cutting path, and the CNC 58 receives X and Y feedback signals from encoders on the motors 34, 44. The X and Y drive signals are also supplied to the HCU 60, and the HCU 60 determined from the X and Y signals the direction of movement of the cutting tool 40 and supplies a C drive signal to the head drive mechanism 46 to control the orientation of the blade 54 in the c direction around the z axis. The HCU 60 also receives a C feedback signal from an encoder in the head drive mechanism 46. The HCU 60 also supplies a Z drive signal to the head drive mechanism 46 to control the height of the blade 54 and receives a Z feedback signal from a further encoder in the drive mechanism 46. The HCU 60 also receives a desired nominal height signal H for the blade 54, which may be manually input via a keyboard or provided by the CNC 58. The control system, except the memory, described thus far is also conventional. The CNC may be implemented by a Model 8600 CNC manufactured by Allen Bradley of Italy. The HCU may be based on a Motorola 68000 microprocessor unit and implemented using modules available from Xycon, of Saline, Mich., U.S.A. However, in the control system, according to the invention, the HCU 60 also can receive a sensor signal S and communicates with the memory 62 in the manner described below.

Figure 4:
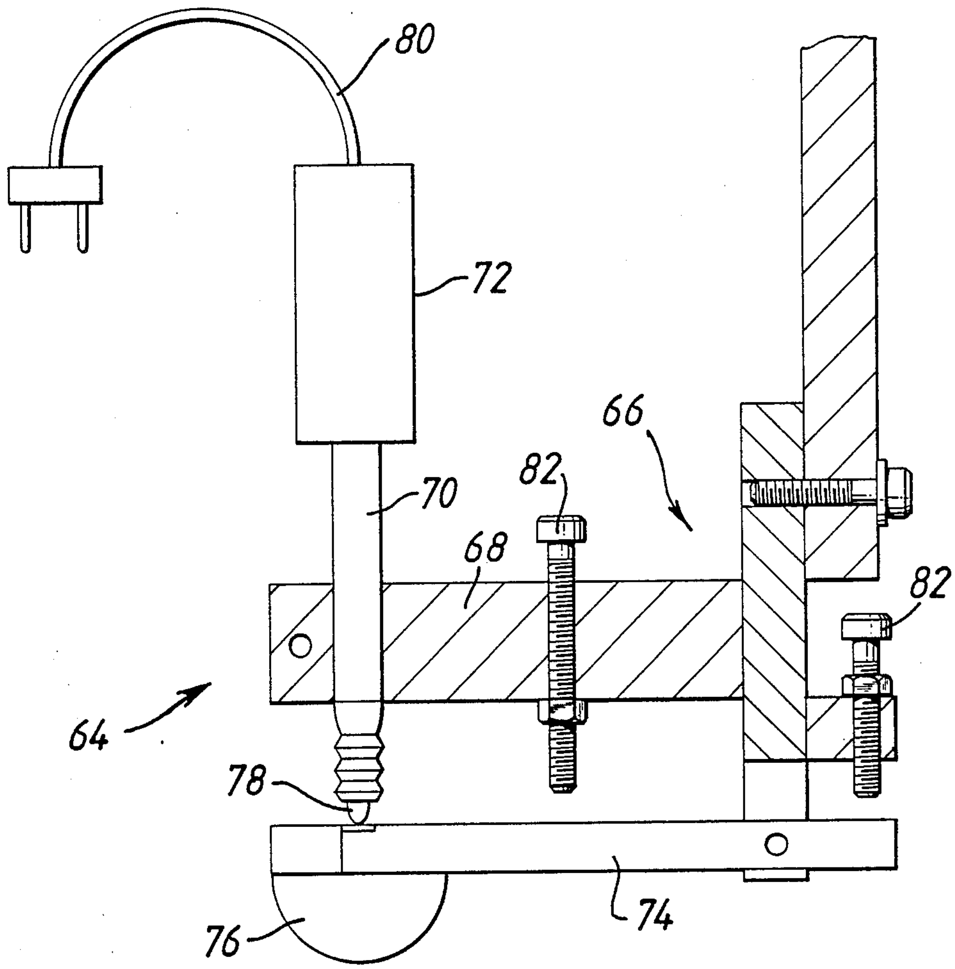
FIG. 4 is a side view of a sensing device for use with the machine.

Referring particularly to FIG. 4, there is shown a sensor unit 64 which can be mounted on the saddle 38 in place of the ultrasonic cutting tool 40. The sensor unit 64 comprises a mounting bracket 66 having an arm 68 to which is attached a mounting tube 70 of a linear variable differential transformer (LVDT) 72. A stylus arm 74 is mounted for pivotal movement on the bracket 66 and has at one end thereof a rounded stylus tip 76. The LVDT 72 has a sensor rod 78 slidable within the mounting tube 70 and bearing with its lower end on the stylus arm 74. The LVDT 72 provides the S signal to the HCU on a cable 80. Over the operable range of the LVDT 72, the sensor signal is directionally proportional to the height of the sensor tip 76 relative to a datum point relative to the saddle 38. The sensor unit also includes stop screws 82 to limit the amount of movement of the stylus arm 74 when the sensor unit is removed from the saddle 38 to assist in preventing damage to the sensor unit.

When the cutting machine is first commissioned, and at desired intervals thereafter, the cutting tool 40 is replaced by the sensor unit 64, and the machine operated in a mapping mode under the control of the HCU 60. In this mode, value a derived from the sensor signal S is stored in the memory 62 for each of a matrix of locations over the work surface. In its simplest form, the memory 62 is arranged two dimensionally. The sensor unit 64 is scanned in the Y direction and is sub-scanned in the X direction. At every 25 mm location along the sub-scan line in the X direction, a value a(u, v) corresponding to the current sensor signal S(X, Y) (or an average value of a plurality of sensor signals over a 25 mm range) is stored in the memory at an address location (u, v) corresponding to the current X and Y coordinates. Once one sub-scan has been completed, the sensor unit 64 is moved in the scan Y direction by 25 mm, and a further sub-scan is carried out. Once the operation has been completed, the memory contains at memory addresses u,v (for u and v corresponding to X and Y ranging over the length and width of the work surface in 25 mm steps) adjustment data a(u,v) corresponding to the sensor signals S(X,Y). Thus, the memory contains a mapping indicating the irregularities in the work surface relative to the saddle 38.

In operation of the machine for cutting, the sensor unit 64 is replaced by the cutting tool 40. The nominal required blade height is derived from by the HCU 60 by the signal H. During cutting, with the X,Y position of the blade under control of the CNC 58, the signal Z(X,Y) to control the height of the blade is derived from the nominal height signal H as modified by the adjustment data contained in the memory 62 for the particular position of the blade on the work surface. Thus, the HCU performs the calculation Z(X,Y)=H+k.a(u,v), where k is a constant and (u,v) is the memory address corresponding to the position (X,Y), and a(u,v) is the adjustment data stored at that memory address.

In a basic embodiment of the height adjustment system, the data stored in the memory for a position X, Y is used to modify the blade height control for x positions between X and the next stored value of X and for y positions between the position Y and the next stored position of Y. However, in a modified embodiment, 2-dimensional interpolation may be employed of the data stored in the memory 62 for positions of the blade between the positions for which data is stored. Thus, if the blade is at a position (X,Y), where X lies between adjacent x coordinates XL,XH for which adjustment data is stored, and Y lies between adjacent y coordinates YL,YH for which adjustment data is stored, and if the adjustment data stored for the three coordinates (XL,YL), (XL,YH) and (XH,YL) is a(ul,vl), a(ul,vh) and a(uh,vl), respectively, then the HCU 60 may perform the calculation:

$$Z(X,Y) = H + k \cdot a(ul,vl) + k \cdot \{a(ul,vh) - a(ul,vl)\} \cdot (Y - YL)/(YH - YL) + k \cdot \{a(uh,vl) - a(ul,vl)\} \cdot (X - XL)/(XH - XL)$$

In an example of the machine described above, it has been possible to maintain the height of the blade relative to the work surface within a tolerance of ±0.05 mm.

Figures 5A, 5B:
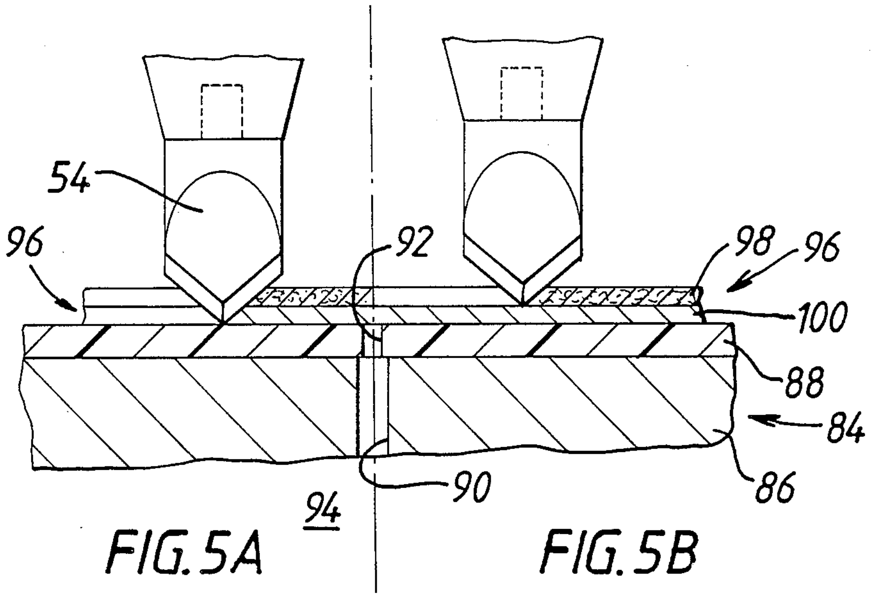
FIGS. 5A and 5B illustrate two modes of cutting in material.

Referring to FIGS. 5A and 5B, a modified work bed 84 is shown which is permanently attached to the support structure 10. The work bed comprises a steel table 86 which is covered with a polyurethane film 88 of a thickness of approximately 0.4 mm bonded to the table 86. The steel table 86 is formed with a matrix of holes 90 of 2 mm diameter and 25 mm pitch. The polyurethane film 88 is also formed with holes 92 in register with the holes 90 and of less than 1 mm diameter. The holes 90 communicate with a plenum chamber 94 to which suction is applied, so that a work piece 96 is held down on the polyurethane film 88.

Referring particularly to FIG. 5A, when it is desired to cut completely through the work piece 96, the nominal height of the blade 54 defined by the signal H is set so that the blade 54 cuts into the polyurethane film 88 to a nominal depth equal to half the tolerance range of the height control of the blade 54 relative to the work bed 84. Thus, in the example where the tolerance is ±0.05 mm and thus the tolerance range is 0.1 mm, the blade 54 is set to cut to a nominal depth of 0.05 mm into the polyurethane film 88. In this way, although the polyurethane film is scored by the blade, the amount of scoring is limited, and it has been found that the polyurethane film 88 will have a substantial life despite such limited scoring of the surface of it. The blade 54 may be set to cut a greater nominal depth into the polyurethane film 88, such as to a nominal depth of twice the tolerance range of the height control system.

As illustrated with respect to FIG. 5B, the work piece may have an upper layer 98 of material to be cut and a lower backing sheet 100. In this case, the nominal depth of cutting into the backing sheet 100 is set in the same way as the nominal depth of cutting into the polyurethane film 88 as described above with respect to FIG. 5A. Thus, the upper layer 98 can be cut completely through, and yet scoring of the backing sheet 100 is kept to a minimum. Thus, after the cutting operation has been performed, the cut pieces of the upper layer 98 can be removed from the machine still attached to the intact backing sheet 100.

Figure 6:
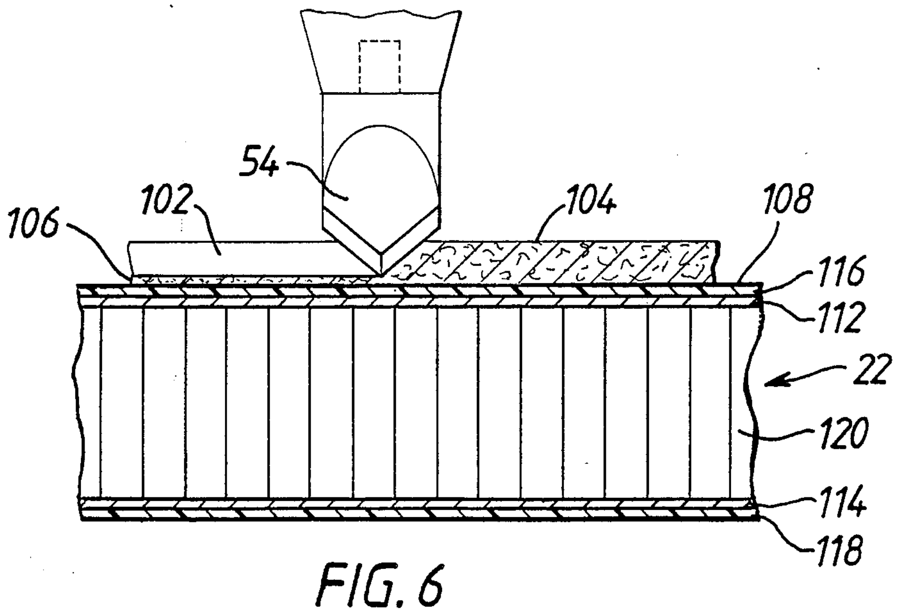
FIG. 6 illustrates another mode of cutting a material.

Referring to FIG. 6, there is shown an example of operation of the machine, in which a score line 102 is cut into the work piece 104, to leave an uncut thickness 106 of the work piece. Such score lines are formed in order to enable the work piece to be folded with minimal resistance, whilst the portions of the work piece to either side of the score line 102 remain attached. In this example, the blade 54 cuts into the work piece to a nominal height above the work surface 108 which is slightly greater than half of the tolerance range of the height control for the blade 54. Thus, in the example given above where the tolerance range is 0.1 mm, the nominal height of the blade above the work surface 108 is set to be slightly greater than 0.05 mm, for example 0.07 mm. Thus, it is ensured that a deep score line 102 is provided without completely cutting through the work piece 104. If a slightly deeper uncut portion 106 is desired, then the nominal height of the blade 54 above the work surface 108 can be set to a greater value, such as up to twice the tolerance range of the height adjusting system.

In the arrangement of the FIG. 6, a removable pallet 22 of the type shown in FIG. 1 is illustrated. The pallet 22 has upper and lower aluminum plates 112, 114 sandwiching therebetween an aluminum honeycomb structure 120. Each of the plates 112, 114 is perforated with a matrix of holes of pitch of 6 mm and each of a diameter of 3 mm. The honeycomb structure 120 has a matrix of passageways extending in the direction perpendicular to the plates 112, 114. The external surfaces of the plates 112, 114 are coated with a microporous polyurethane film 116, 118 of a thickness of 0.4 mm. Thus, the pallet 22 is substantially unidirectionally air permeable, in a direction perpendicular to the plates 112, 114. In the arrangement of FIG. 6, a vacuum cup is moved around under the pallet 22 in register with the blade 54 to produce a suction zone between the work piece 104 and the pallet 22 in the region of the blade 54 to hold the work piece down. A plurality of such pallets are supplied with the machine and can be interchangeably mounted on the support structure 10. In this way, work pieces can be laid out on one pallet 22 whilst cutting is being carried out on the work pieces on another pallet 22 loaded onto the machine. In these circumstances, the memory 62 obtains data concerning the irregularity of each of the pallets which can be loaded onto the machine, and the HCU 60 is responsive to a further signal P indicative of the particular pallet which is being used. Then, in operation, the HCU refers to the appropriate part of the memory 62 in controlling the height of the cutting blade. In the arrangement as shown in FIG. 1, where each pallet may be placed at two different locations on the support structure, the memory may additionally store two sets of data for each pallet corresponding to each of the positions at which the pallet may be placed on the support structure.

I claim:

1. A machine for cutting sheet-like workpieces, comprising:

- a work surface on which to lay a sheet-like workpiece;
- a cutting blade;
- a guidance system for guiding the blade along a cutting path to cut the workpiece along that path; and
- means to adjust the height of the blade as the blade moves along the cutting path;

characterised in that:

- the height adjusting means includes a memory which stores data indicative of irregularities of the guidance system and the work surface relative to each other, the height adjusting means being responsive to the stored data in adjusting the height of the blade.

2. A machine as claimed in claim 1, wherein the memory stores the data for each of a matrix of positions of the blade over the work surface.

3. A machine as claimed in claim 2, wherein the height adjusting means is operable to interpolate the data for positions of the blade between the positions for which data is stored.

4. A machine as claimed in claim 2, wherein the guidance system provides co-ordinate data for the position of the blade over the work surface, said memory having locations each of which is addressable by the co-ordinate data.

5. A machine as claimed in claim 1, wherein the blade is removable from the guidance system and further comprising a sensor which can be mounted on the guidance system to replace the blade, the machine being operable in a mapping mode in which the guidance system scans the sensor over the work surface, and the sensor provides data which is stored in the memory.

6. A machine as claimed in claim 5, wherein the sensor comprises a stylus which engages the work surface to sense the irregularities of the guidance system and the work surface relative to each other.

7. A machine as claimed in claim 6, wherein the sensor engages the work surface at substantially the same position as that taken up by the blade when the sensor is replaced by the blade.

8. A machine as claimed in claim 1, further comprising a support structure, and wherein the work surface is provided by any of a plurality of interchangeable pallets mountable on the support structure, the memory storing data for each of the pallets, and the machine further comprising means for indicating which of the pallets is mounted on the support structure.

9. A machine as claimed in claim 1, wherein the work surface is substantailly planar.

10. A method of operating a machine for cutting sheet-like workpieces, of the type comprising a work surface on which to lay a sheet-like workpiece; a cutting blade; a guidance system for guiding the blade along a cutting path to cut the workpiece along that path; and means to adjust the height of the blade as the blade moves along the cutting path, the height adjusting means having a tolerance range;

- the method including the step of cutting through the workpiece and into the work surface to a nominal depth which is not greater than twice the tolerance range of the height adjusting means.

11. A method as claimed in claim 10, wherein the nominal depth is not greater than said tolerance range.

12. A method as claimed in claim 11, wherein the nominal depth is about equal to half of said tolerance range.

13. A method as claimed in claim 10, wherein said tolerance range is not substantially greater than 0.1 mm.

14. A method as claimed in claim 10, wherein the work surface has a plastics coating.

15. A method as claimed in claim 14, wherein the plastics coating is of polyurethane.

16. A method as claimed in claim 10, further comprising the step of vibrating the blade ultrasonically.

17. A method of operating a machine for cutting sheet-like workpieces, of the type comprising a work surface on which to lay a sheet-like workpiece; a cutting blade; a guidance system for guiding the blade along a cutting path to cut the workpiece along that path; and means to adjust the height to the blade as the blade moves along the cutting path, the height adjusting means having a tolerance range;

- the method including the step of cutting a score line into the workpiece to a nominal height above the work surface which is not greater than twice the tolerance range of the height adjusting means.

18. A method as claimed in claim 17, wherein the nominal height is not greater than the tolerance range.

19. A method as claimed in claim 18, wherein the nominal height is slightly greater than half of the tolerance range.

20. A method as claimed in claim 17, wherein the tolerance range is not substantially greater than 0.1 mm.

21. A method as claimed in claim 17, further comprising the step of vibrating the blade ultrasonically.

22. A method of operating a machine for cutting sheet-like workpieces, of the type comprising a work surface on which to lay a sheet-like workpiece; a cutting blade; a guidance system for guiding the blade along a cutting path to cut the workpiece along that path; and means to adjust the height of the blade as the blade moves along the cutting path, the height adjusting means having a tolerance range;

the method including the steps of placing a backing sheet beneath the workpiece and cutting through the workpiece and into the backing sheet to a nominal depth into the backing sheet which is not greater than twice the tolerance range of the height adjusting means.

23. A method as claimed in claim 22, wherein the nominal depth is not greater than said tolerance range.

24. A method as claimed in claim 23, wherein the nominal depth is about equal to half of said tolerance range.

25. A method as claimed in claim 22, wherein said tolerance range is not substantially greater than 0.1 mm.

26. A method as claimed in claim 22, further comprising the step of vibrating the blade ultrasonically.

27. A method as claimed in claim 16, wherein the peak-to-peak amplitude of ultrasonic vibration of the blade is about 0.05 mm, or less.

28. A method as claimed in claim 21, wherein the peak-to-peak amplitude of ultrasonic vibration of the blade is about 0.05 mm, or less.

29. A method as claimed in claim 26, wherein the peak-to-peak amplitude of ultrasonic vibration of the blade is about 0.05 mm, or less.

* * * * *